US011416102B2

(12) United States Patent
Li

(10) Patent No.: US 11,416,102 B2
(45) Date of Patent: Aug. 16, 2022

(54) CONTENT INPUT METHOD, TOUCH INPUT DEVICE AND STORAGE MEDIUM

(71) Applicant: BEIJING XIAOMI MOBILE SOFTWARE CO., LTD., Beijing (CN)

(72) Inventor: Yanlong Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/211,454

(22) Filed: Mar. 24, 2021

(65) Prior Publication Data
US 2021/0405849 A1 Dec. 30, 2021

(30) Foreign Application Priority Data
Jun. 30, 2020 (CN) .......................... 202010614082.4

(51) Int. Cl.
G06F 3/038 (2013.01)
G06F 3/041 (2006.01)
(52) U.S. Cl.
CPC ...... G06F 3/04186 (2019.05); G06F 3/04146 (2019.05)
(58) Field of Classification Search
CPC ............. G06F 3/04186; G06F 3/04146; G06F 3/0416; G06F 1/1652; G06F 3/038; G06F 3/0412; G06F 3/0488; G06F 2203/04102; G06F 2203/04105; G06F 1/1616; G06F 3/03547; G06F 3/04883; G06F 3/04886; G06F 3/0414; G06F 3/04847; G06F 2203/04108; H04M 1/0268; H04M 1/0214
See application file for complete search history.

(56) References Cited

U.S. PATENT DOCUMENTS

| 2006/0109252 A1* | 5/2006 | Kolmykov-Zotov ....................... G06F 3/04186 345/173 |
| 2012/0126962 A1* | 5/2012 | Ujii ........................ G06F 3/0488 340/407.2 |
| 2012/0299859 A1* | 11/2012 | Kinoshita ............ G06F 3/04186 345/173 |
| 2013/0050133 A1* | 2/2013 | Brakensiek ............ G06F 3/0416 345/174 |

(Continued)

FOREIGN PATENT DOCUMENTS

EP    1659481 A2    5/2006

OTHER PUBLICATIONS

CNMO Mobile China, "Lenovo has launched the world's first dual-screen laptop, quite nice", https://baijiahao.baidu.com/s?id=1610311270015207029&wfr=spider&for=pc, Aug. 31, 2018, (5p).

(Continued)

Primary Examiner — Lunyi Lao
Assistant Examiner — Jarurat Suteerawongsa
(74) Attorney, Agent, or Firm — Arch & Lake LLP

(57) ABSTRACT

A content input method is provided. The content input method includes: obtaining pressure information applied to a first preset area of a display area; determining, according to a first pressure threshold, whether the pressure information applied to the first preset area is inadvertent touch information; when the pressure information applied to the first preset area is the inadvertent touch information, ignoring the pressure information.

17 Claims, 8 Drawing Sheets

(56) References Cited

U.S. PATENT DOCUMENTS

| | | | |
|---|---|---|---|
| 2016/0062634 A1* | 3/2016 | Kurita | G06K 9/00402 |
| | | | 715/268 |
| 2017/0003876 A1 | 1/2017 | Marsden | |
| 2017/0010799 A1* | 1/2017 | Yaron | G06F 3/04886 |
| 2019/0286317 A1 | 9/2019 | Marsden | |
| 2021/0132796 A1 | 5/2021 | Marsden | |

OTHER PUBLICATIONS

Partial European Search Report issued to EP Application No. 21165123.7 dated Jan. 31, 2022, (20p).

* cited by examiner

CONTENT INPUT METHOD, TOUCH INPUT DEVICE AND STORAGE MEDIUM

CROSS-REFERENCE TO RELATED APPLICATIONS

This application claims the priority of Chinese Patent Application No. 202010614082.4, filed on Jun. 30, 2020, the contents of which are hereby incorporated by reference in their entirety for all purposes.

BACKGROUND

A keyboard input device may include a mechanical key type and a touch type. A keyboard input device of the mechanical key type may merely be used as the keyboard due to a single function.

A keyboard input device of a touch type has not been widely used because there is no tactile feedback, or the effect of the feedback is far from that of the mechanical key type.

SUMMARY

The disclosure provides a content input method, touch input device and storage medium.

According to a first aspect of the examples of the disclosure, there is provided a content input method, applied to a touch input device includes a display area, the display area displays a keyboard interface when the touch input device is in a keyboard input mode, and the method includes: pressure information applied to the first preset area of the display area is obtained; whether the pressure information applied to the first preset area is inadvertent touch information is determined according to a first pressure threshold; when the pressure information applied to the first preset area is the inadvertent touch information, the pressure information is ignored.

According to a second aspect of the examples of the disclosure, there is provided a content input device. The device includes a controller, a pressure sensor and a display which are electrically connected to the controller, and the controller is electrically connected to an external operating system, herein the controller is configured to: obtain pressure information applied to a first preset area of the display area via the pressure sensor; determine, according to a first pressure threshold, whether the pressure information applied to the first preset area is inadvertent touch information; and ignore the pressure information when the pressure information applied to the first preset area is the inadvertent touch information.

According to a third aspect of the examples of the disclosure, there is provided a non-transitory computer-readable storage medium storing instructions, which, when being executed by the controller of the touch input device, cause the touch input device to preform the content input method as described above.

It is to be understood that the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate examples consistent with the disclosure and, together with the description, serve to explain the principles of the disclosure.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure as recited in the appended claims.

In the related art, the touch keyboard cannot be like a traditional keyboard on which the palm can be directly placed. Because the touch keyboard is more sensitive, when the palm is placed on the keyboard, an inadvertent touch on the keyboard will be caused. Therefore, in the current touch keyboard, blind typing cannot be realized, thus resulting in low typing efficiency. Moreover, the user is tired when the palm is suspended for a long time, which will reduce the typing efficiency.

The disclosure proposes a content input method applied to a touch input device. The touch input device includes a display area. When the touch input device is in the keyboard input mode, the display area displays a keyboard interface. That is, the touch input device is equivalent to a touch keyboard when it is in the keyboard input mode. In the content input method, whether it is inadvertent touch information is determined by setting a first pressure threshold, and if it is the inadvertent touch information, it is ignored. Therefore the defect that the touch keyboard is prone to be touched inadvertently is solved and the typing efficiency and user experience are improved.

Figure 1:
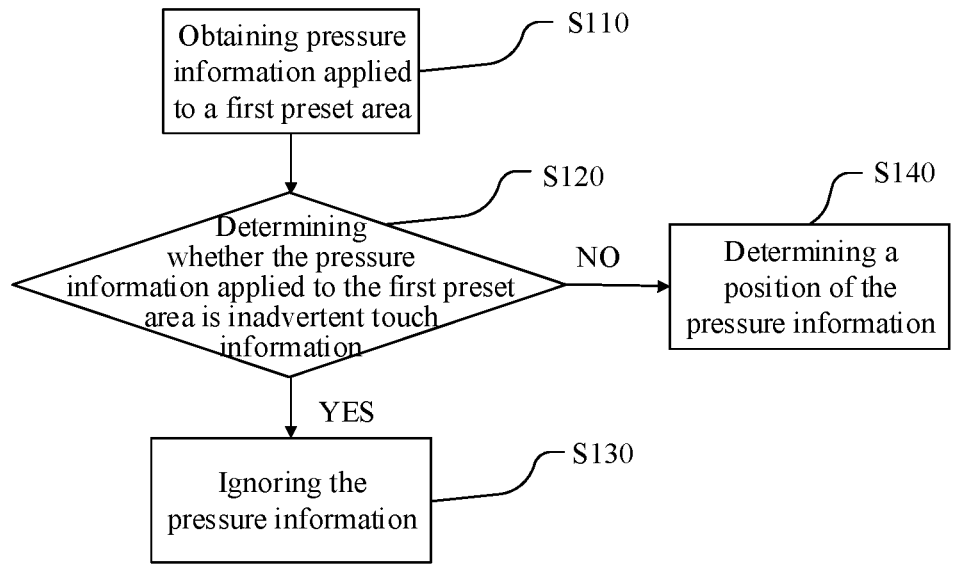
FIG. 1 is a flowchart of a content input method in accordance with an example of the present disclosure.

In an example, referring to FIG. 1, a content input method is provided. The method includes the following operations.

In operation S110, pressure information applied to a first preset area of a display area is obtained.

Herein, the first preset area is, for example, a key area of a keyboard interface, and a respective content is inputted by obtaining pressure information of the key area. The method of converting the pressure information into input content can be found in the prior art, elaborations are omitted herein.

When a keyboard is displayed on the display interface of the touch input device, that is, when the touch input device operates in a keyboard mode, according to the usage habit of people, a support point of the palm is generally placed near a space bar. Therefore, the first preset area can be the area near the space bar. Of course, it is understandable that, according to the usage habit of each person, the user can set another area, such as an area near the enter key as the first preset area, according to his/her habit. In some special cases, the first preset area may also be an entire display interface, so as to avoid inadvertent touch in the entire display area and improve user comfort.

In operation S120, whether the pressure information applied to the first preset area is inadvertent touch information is determined according to a first pressure threshold.

If the pressure information applied to the first preset area is the inadvertent touch information, operation S130 is performed; if the pressure information applied to the first preset area is not the inadvertent touch information, operation S140 is performed.

Different users have different typing strengths, and the respective first pressure thresholds can be set according to different user habits to better meet the different needs of users.

In generally, if the user performs information entry according to their wishes, the strength of the finger pressing the display interface will be relatively large. However, when the user touches the display interface inadvertently instead of touching the display interface according to his wishes, the pressing strength will usually be relatively small. By setting the first pressure threshold, the strengths of the user pressing the display interface can be categorized, and then it is determined whether it is an inadvertent touch. Herein, the first pressure threshold may be, for example, 20 gf to 100 gf. The first pressure threshold can be adjusted by users according to their own usage habit. For example, if the user wants to avoid the inadvertent touch to the maximum extent, the first pressure threshold can be set to 100 gf. For another example, if the user wants a higher sensitivity, the first pressure threshold can be set to 20 gf. For another example, the first pressure threshold may be set to 60 gf by default.

In operation S130, the pressure information is ignored.

In the content input method, if it is determined that the pressure information is inadvertent touch information, it means that the pressure information obtained is not what the user wants to input subjectively, the pressure information is ignored, so as to avoid inputting unwanted content due to inadvertent touch during the input process to reduce the typing efficiency.

Through the above-described content input method, part of the inadvertent touch information can be filtered out by setting the first pressure threshold, so as to better avoid the occurrence of inadvertent touch, and improve typing efficiency and user experience.

In operation S140, a position of the pressure information is determined.

In the operation, if the pressure information is not the inadvertent touch information, it means that the pressure information is inputted according to the user's wishes, then the position of the pressure information is determined to determine the content input by the user.

Figure 2:
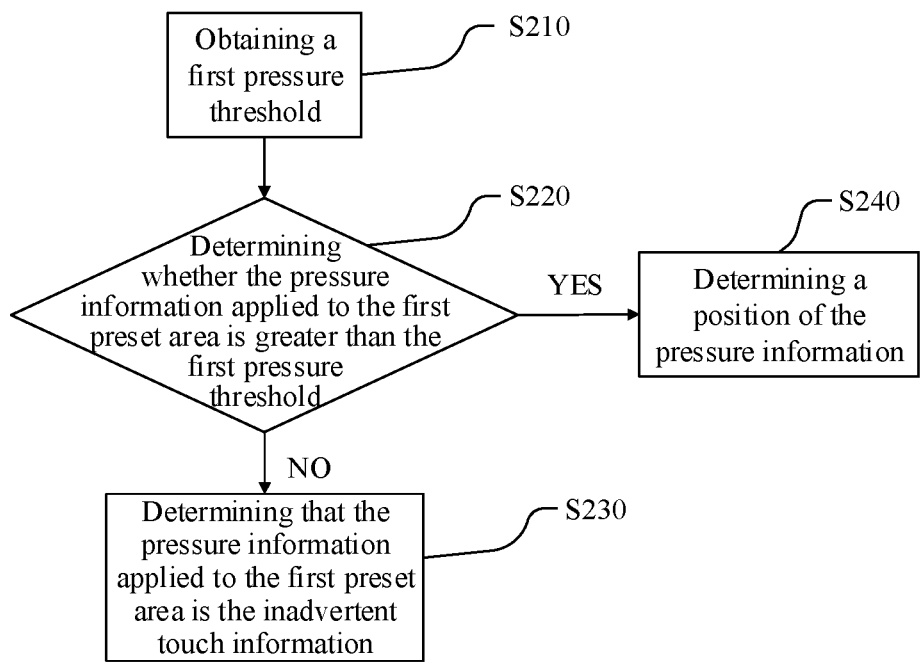
FIG. 2 is a flowchart of a content input method in accordance with an example of the present disclosure.

In an example, referring to FIG. 2, a content input method is provided. The content input method is a further optimization of the operation S120 in the above-described example, and the method specifically includes the following operations.

In operation S210, a pre-stored first pressure threshold is obtained.

The pre-stored first pressure threshold can be modified, and the users can modify the first pressure threshold according to their own usage habit to better adapt to their typing habit.

In operation S220, it is determined whether the pressure information applied to the first preset area is greater than the first pressure threshold.

If the pressure information applied to the first preset area is not greater than the first pressure threshold, operation S230 is performed; if the pressure information applied to the first preset area is greater than the first pressure threshold, operation S240 is performed.

In operation S230, it is determined that the pressure information applied to the first preset area is the inadvertent touch information.

For example, the pre-stored first pressure threshold is in a range of 20 gf to 100 gf, and the inadvertent touch can be better avoided by setting a greater first pressure threshold. Alternatively, the first pressure threshold is 60 gf, when the obtained pressure information is smaller than or equal to 60 gf, it is determined that the pressure information is the inadvertent touch information.

In operation S240, the position of the pressure information is determined.

Figure 3:
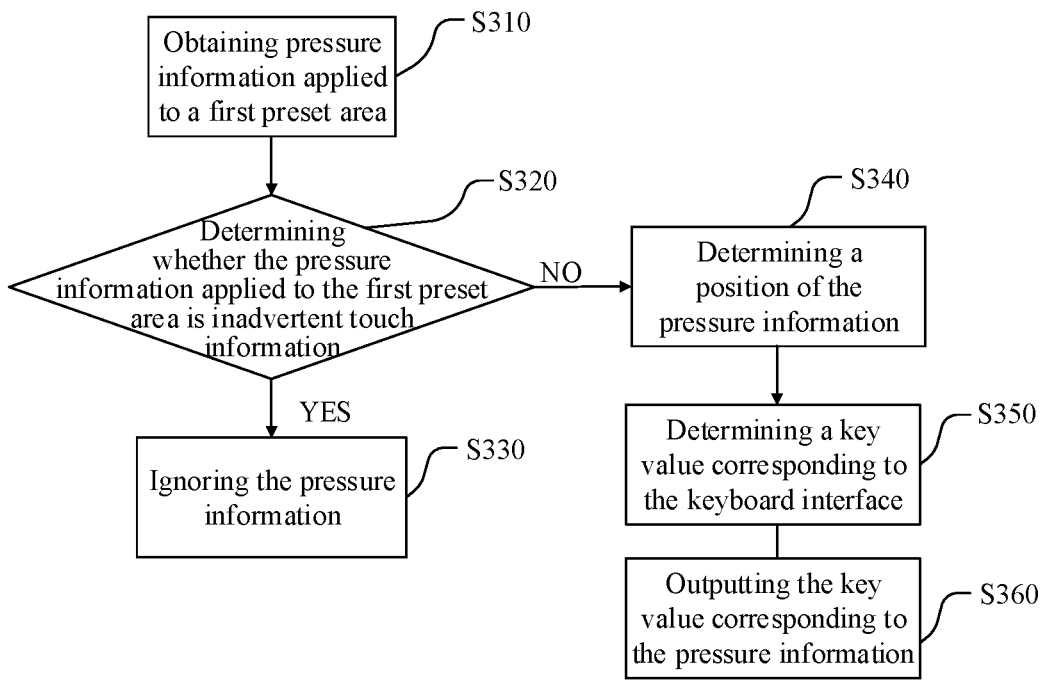
FIG. 3 is a flowchart of a content input method in accordance with an example of the present disclosure.

In an example, referring to FIG. 3, a content input method is provided. The method is a further optimization based on the content input method in the above-described example, and the method specifically includes the following operations.

In operation S310, the pressure information applied to the first preset area of the display area is obtained.

In operation S320, it is determined whether the pressure information applied to the first preset area is inadvertent touch information according to the first pressure threshold.

In operation S330, if the pressure information applied to the first preset area is the inadvertent touch information, the pressure information is ignored.

In operation S340, if the pressure information applied to the first preset area is not the inadvertent touch information, a position of the pressure information applied to the first preset area in the display area is determined.

When it is determined that the pressure information applied to the first preset area is not the inadvertent touch information, a coordinate of the pressure information source is scanned in the first preset area to determine the position of the pressure information applied to the first preset area in the display area, that is, a position of the button pressed by user is confirmed. For example, when it is determined that the pressure information of the user pressing the W button is not the inadvertent touch information, it is determined that the W button is the position of the pressure information applied to the first preset area in the display area.

In operation S350, a key value corresponding to the position on the keyboard interface is determined according to the position.

After the position is determined, it is compared with the pre-stored key value information of the keyboard interface to determine the key value corresponding to the position. For example, when it is determined that the pressure information of the user pressing the W button is not the inadvertent touch information, it is determined that the key value corresponding to the position on the keyboard interface is the key value corresponding to W. It is understandable that, in order to ensure the accuracy of input, each key on the display interface corresponds to a different key value.

In operation S360, the key value corresponding to the pressure information applied to the first preset area is outputted.

When the key value corresponding to the pressure information applied to the first preset area is determined, the respective key value is outputted. For example, when it is determined that the pressure information of the user pressing the W button is not the inadvertent touch information, the key value W is output.

The touch input device transmits the key value corresponding to the W button to other smart devices connected to it. The smart device is installed with a windows system, etc. When the windows system receives the key value, it is determined according to the key value that letter information of W is inputted by the user, to display and process it.

Figure 4:
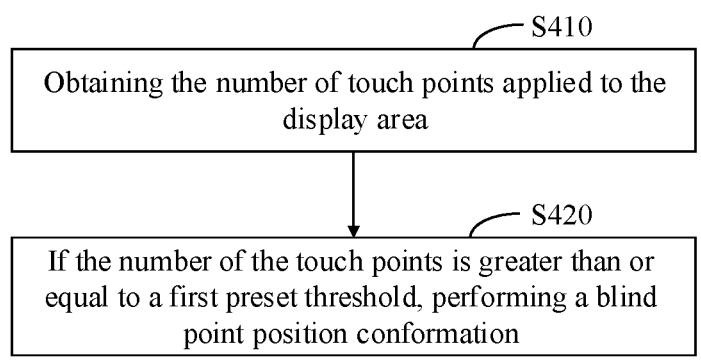
FIG. 4 is a flowchart of a content input method in accordance with an example of the present disclosure.

In an example, referring to FIG. 4, a content input method is provided to determine whether the user is ready for blind typing input, so as to ensure that the user performs efficient input. The method specifically includes the following operations.

In operation S410, a number of touch points applied to the display area is obtained.

Specifically, when the touch input device is in the keyboard input mode, the operation is used to detect how many fingers touch the display area.

In operation S420, if the number of touch points is greater than or equal to a first preset threshold, a blind point position conformation is performed.

According to the content related to blind typing in the related art, in generally, the blind typing input can be realized as long as the two index fingers of the left hand and the right hand can be placed at the designated positions, so the number of touch points can be two. Therefore, when the user has at least two fingers pressed on the display interface, the display interface receives at least two touch points, which means that the user has a need for input.

Herein, when the number of detected touch points is greater than or equal to the first preset threshold, the blind point position is confirmed. After the blind point position is conformed, the user can perform a blind typing operation to realize quick input.

For example, in order to ensure that all of the fingers of user can be placed on the keys for the blind type, and to avoid placing the finger of user in a wrong place to affect the typing speed, the first preset threshold can be set to 9. That is, the index finger to little thumbs of the left hand and the right hand are all placed on different keys of the keyboard, and thumbs of the left and right hands are placed on the space bar. When the number of detected fingers in contact with the display area is equal to the first preset threshold (i.e., 9), then it starts to perform the blind point position conformation to better facilitate subsequent content input.

Figure 5:
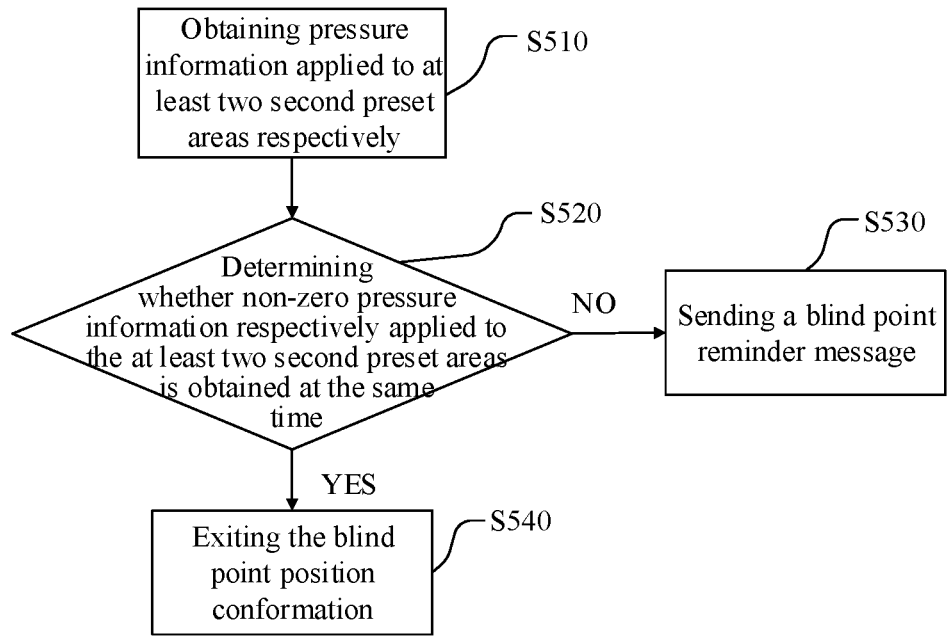
FIG. 5 is a flowchart of a content input method in accordance with an example of the present disclosure.

In an example, referring to FIG. 5, a content input method is provided, the method is a further optimization based on the operation S420 of the above-described example, and the method specifically includes the following operations.

In operation S510, pressure information applied to at least two second preset areas is obtained respectively.

It should be noted that the greater the number of second preset areas, the higher the accuracy of the blind point position confirmation; the fewer the number of second preset areas, the faster the speed of the blind point position confirmation. The user can set the second preset area according to their own needs, including setting the position of the second preset area and setting the number of second preset areas.

Since the blind point confirmation is performed through an F key and a J key in the mechanical type keyboard, in order to more convenient for users to use, in one example, two second preset areas are provided, for example, the area corresponding to the F key and the area corresponding to the J key, the blind point position confirmation is performed according to the pressure information applied to the area corresponding to the F key and the J key, so that the blind point position confirmation can be performed quickly.

In another example, three second preset areas are set, such as an area corresponding to the F key, an area corresponding to the J key, and an area corresponding to the space bar. The blind point position confirmation is performed according to the pressure information applied to the areas corresponding to the F key, the J key and the space bar respectively, to further improve the accuracy of the blind point position confirmation.

In operation S520, it is determined whether non-zero pressure information respectively applied to the at least two second preset areas is obtained at the same time.

If the non-zero pressure information respectively applied to the at least two second preset areas is not obtained at the same time, operation S530 is performed; if the non-zero pressure information respectively applied to the at least two second preset areas is obtained at the same time, operation S540 is performed.

If the pressure information applied to the at least two second preset areas is not zero, it means that the user has at least two fingers pressed on the display interface, that is, the user has a need to input content through the display interface, and the user has placed his hand on the correct position where he can perform blind typing. Therefore, the blind point confirmation can be exited.

In operation S530, a blind point reminder message is sent.

In the operation, if the non-zero pressure information respectively applied to the at least two second preset areas is not obtained at the same time, it means that the user wants to input content through the display interface. In order to remind the user to perform the blind typing input and improve the input efficiency of the user, a blind point confirmation message is sent.

When two second preset areas, i.e. the area corresponding to the F key and the area corresponding to the J key are set, it is determined whether non-zero pressure information respectively applied to the at least two second preset areas is detected at the same time, if the non-zero pressure information respectively applied to the at least two second preset areas is not obtained at the same time, the blind point reminder message is sent. That is, if the finger of user does not press both the F key and the J key at the same time, the blind point reminder message is sent. The blind point reminder message is, for example, two or three consecutive short-interval vibrations, so as to better assist the user in confirming the position of the blind point and improve the efficiency of the blind point position confirmation.

In addition to using vibration as the blind point reminder message, the blind point reminder message can also be sent by sounding. For example, the touch input device is provided with a speaker, and when a blind point reminder message needs to be sent, the touch input device can emit a buzzer sound. Alternatively, the speaker can be provided on the smart device connected to the touch input device for sending the blind point reminder message.

In operation S540, the blind point position conformation is exited.

Figure 6:
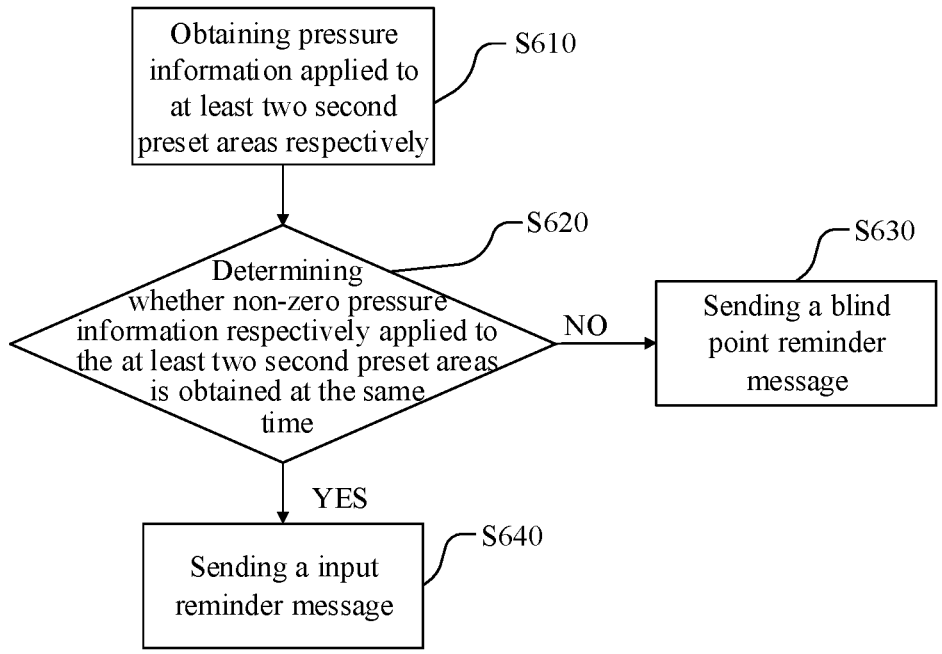
FIG. 6 is a flowchart of a content input method in accordance with an example of the present disclosure.

In an example, referring to FIG. 6, a content input method is provided. The method is a further optimization based on the above-described example, and the method specifically includes the following operations.

In operation S610, pressure information applied to at least two second preset areas respectively is obtained;

In operation S620, it is determined whether non-zero pressure information respectively applied to the at least two second preset areas is obtained at the same time;

In operation S630, if the non-zero pressure information respectively applied to the at least two second preset areas is not obtained, the blind point reminder message is sent.

In operation S640, if the non-zero pressure information respectively applied to the at least two second preset areas is obtained, an input reminder message is sent.

In an example, when two second preset areas, i.e. the area corresponding to the F key and the area corresponding to the J key, are set, if the non-zero pressure information respectively applied to the at least two second preset areas is obtained at the same time, it means that the user has placed his hand on the corresponding position, which can facilitate the blind typing operation. At this time, operation S640 may be executed, in which the input reminder information is sent by voice to remind the user that the finger is in the correct position, or by vibrating for a long time to remind the user that the finger has placed on the correct position. That is, when the finger of user presses both the F key and the J key at the same time, it means that the user has placed the finger on a position where blind typing can be performed, no blind point reminder message is sent to reminder the user that the blind point position confirmation is completed. Then the blind point position confirmation is exited, and the subsequent formal content input is preceded.

Of course, it is understandable that in order to further facilitate the user to quickly find the blind point position, a physical raised structure can be set on some positions on the touch input device, such as the F key and the J key, to facilitate the user's use and improve the efficiency of input.

Figure 7:
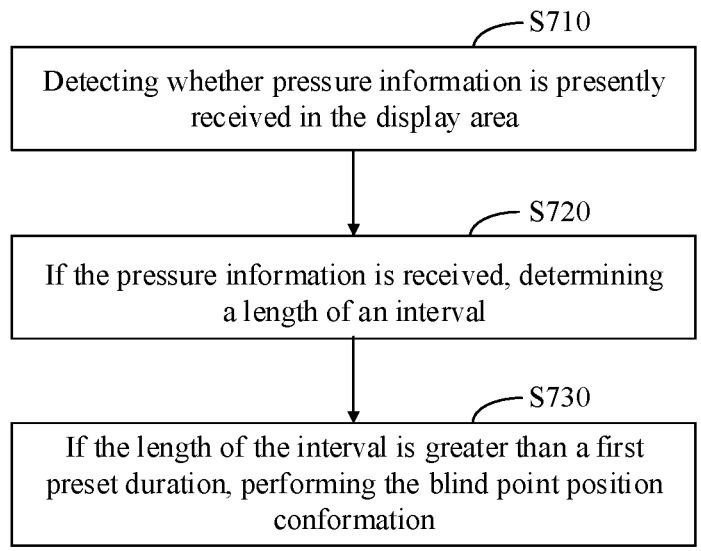
FIG. 7 is a flowchart of a content input method in accordance with an example of the present disclosure.

In an example, referring to FIG. 7, a content input method is provided. The method is a further improvement after the above-described operation S540 of exiting the blind point position conformation. The method specifically includes the following operations.

In operation S710, it is detected whether pressure information is presently received in the display area.

After the blind point position confirmation is exited, a formal content input process is entered. If the user is performing normal content input, it can be detected that the display area continuously receives pressure information. If the user no longer performs normal content input for some reasons, it cannot be detected that the display area receives pressure information. In this case, if the user needs to enter the normal content input process again, the blind point position confirmation needs to be performed again to facilitate normal content input. In view of the above-described reasons, it will continuously detect whether the display area currently receives pressure information, and it is determined whether to re-enter the blind point confirmation process according to the detected result, so as to facilitate the user's content input.

In the operation, the display area is the display interface of the entire touch input device.

In operation S720, if the pressure information is presently received, a length of an interval between a time when the pressure information is presently received and a time when pressure information was received last time is determined.

When the user is performing the normal content input, the detected length of the interval between the time when the pressure information is presently received and the time when pressure information was received last time will be relatively short. When the user stops the normal content input, the detected length of the interval between the time when the pressure information is presently received and the time when pressure information was received last time will be relatively long. Therefore, whether the user in the normal content input process can be determined based on the above-described length of the interval, that is, it is determined whether it is necessary to re-enter the blind point position confirmation based on the above-described length of the interval.

In operation S730, if the length of the interval is greater than or equal to a first preset duration, the blind point position conformation is performed.

As mentioned above, when the above-described length of the interval is relatively long, it means that the user is no longer in the normal content input process, and at this time, it is necessary to re-enter the blind point position confirmation. By setting the first preset duration and comparing it and the length of the interval, if the length of the interval is greater than or equal to a first preset duration, the blind point position confirmation is performed to facilitate the content input of user. Herein, the first preset duration is, for example, 0.3 seconds. That is, if the length of the interval is greater than or equal to 0.3 seconds, the blind point position confirmation is re-entered.

Figure 8:
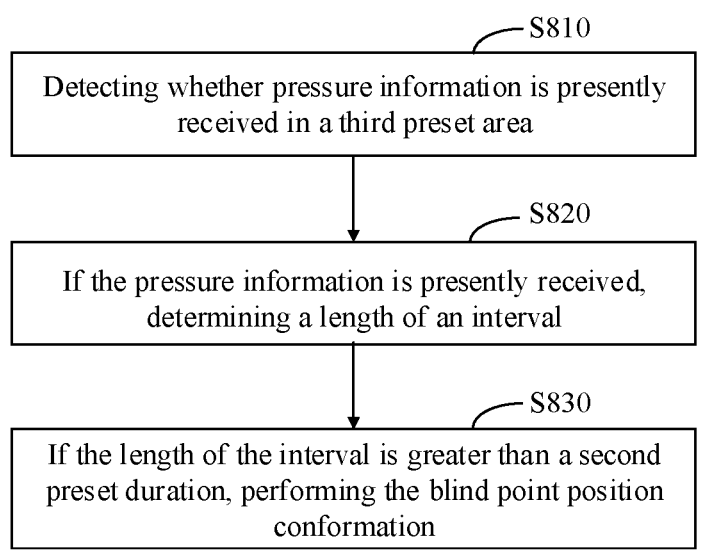
FIG. 8 is a flowchart of a content input method in accordance with an example of the present disclosure.

In an example, referring to FIG. 8, a content input method is provided. The method is a further improvement after the above-described operation S540 of exiting the blind point position confirmation, and the method specifically includes the following operations.

In operation S810, it is detected whether pressure information is presently received in a third preset area of the display area.

When using a mechanical keyboard, the palm of user generally will not leave the keyboard during long-term typing, that is, the palm will always be placed in an area of the keyboard where no keys are set. In view of this, in the content input method, the third preset area is set in the display area. The third preset area is, for example, an area where the palm of the user is placed during typing operation. In the normal content input process, the palm of the user generally will not leave the third preset area. That is, it will always be able to detect that the third preset area receives pressure information. When the palm of user leaves the third preset area, the pressure information in the third preset area disappears at this time, which means that the normal content input of user has stopped.

In operation S820, if the pressure information is presently received, a length of an interval between a time when the pressure information is presently received and a time when pressure information was disappeared last time is determined.

When the user needs to input content again, the palm will touch the third preset area again. At this time, it will be detected again that the pressure information is received in the third preset area. Therefore, whether the user is in the normal content input process can be determined based on the length of the interval between the time when the pressure information is presently received and the time when pressure information was disappeared last time. That is, it is determined whether it is necessary to re-enter the blind point position confirmation based on the above-described length of the interval.

In operation S830, if the length of the interval is greater than or equal to a second preset duration, the blind point position conformation is performed.

When the user performs the normal content input, it is possible that the palm will leave the third preset area briefly. In view of this, the second preset duration is set. Only when the length of the interval is greater than or equal to the second preset duration, the blind point position confirmation will be performed again. The second preset duration is, for example, 0.3 seconds. That is, in a case that the palm of user leaves the third preset area for longer than or equal to 0.3 seconds, the blind point confirmation is performed only when it is detected that pressure information is received again in the third preset area.

Figure 9:
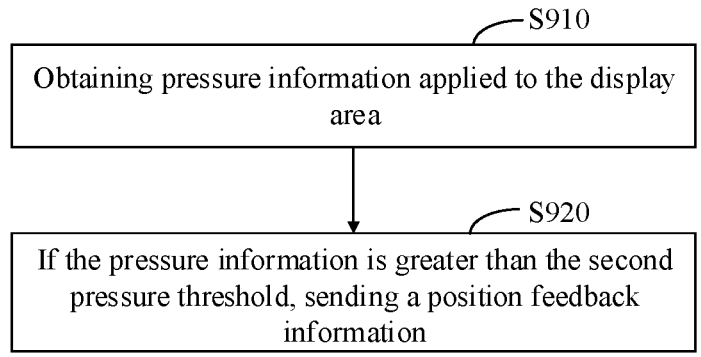
FIG. 9 is a flowchart of a content input method in accordance with an example of the present disclosure.

In an example, referring to FIG. 9, a content input method is provided. The method specifically includes the following operations.

In operation S910, pressure information applied to the display area is obtained.

In operation S920, if the pressure information applied to the display area is greater than a second pressure threshold, position feedback information is sent.

By the position feedback information, the experience of user can be improved, and the user can be reminded that his/her pressing operation has been received by the system, and that he/she can perform a further pressing operation, thereby improving typing efficiency.

It should be noted that the above operations S910 and S920 are not merely set in the formal content input stage, but also can be set in other stages to improve the user experience in each stage.

The second pressure threshold in the operation may be, for example, in a range of 20 gf to 100 gf, and the first pressure threshold may be equal to the second pressure threshold. For example, both the first pressure threshold and the second pressure threshold are 60 gf. The second pressure threshold may be greater than the first pressure threshold. For example, the first pressure threshold is 60 gf and the second pressure threshold is 90 gf.

Figure 10:
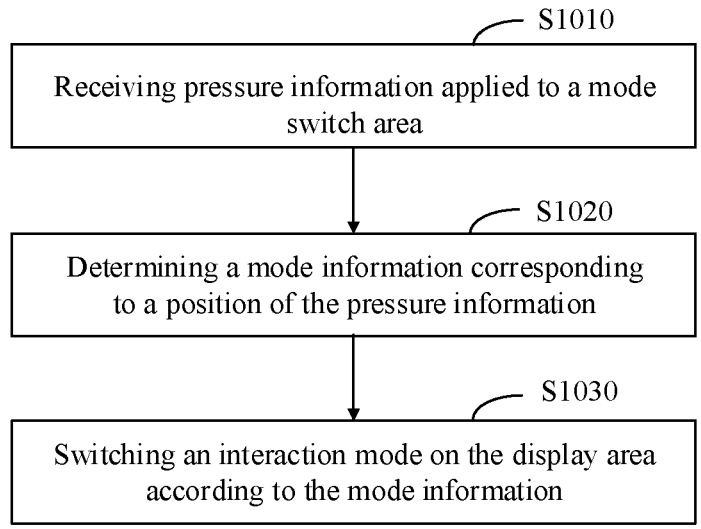
FIG. 10 is a flowchart of a content input method in accordance with an example of the present disclosure.

In an example, as shown in FIG. 10, a content input method is provided. The method is a further improvement of the method of the above-described example. Not only the text can be inputted, but other content can also be inputted, and the method specifically includes the following operations.

In operation S1010, pressure information applied to a mode switch area of the display area is received.

The mode switch area may be provided at an edge of the display area. Optionally, the display area is a square area, and the mode switch area is provided at the upper right corner of the display area, so as to avoid affecting the normal touch operation.

In operation S1020, mode information corresponding to a position of the pressure information applied to the mode switch area is determined.

The mode switching area may include multiple positions corresponding to mode information, such as keyboard input mode, a drawing mode or a display mode. When the position of the pressure information is located at a position corresponding to the keyboard input mode, the keyboard input mode is entered; when the position of the pressure information is located at a position corresponding to the drawing mode, the drawing mode is entered; when it is switched to the display mode, the touch input device can be used as the display screen. The user can set different modes according to their actual use needs to meet various application scenarios. Therefore, the touch input device is smarter, human-computer interaction is better, and the user experience is improved.

In operation S1030, an interactive mode of the display area is switched according to the mode information.

Herein, when the mode information corresponding to the position of the pressure information is the keyboard input mode, the interactive mode of the display area is switched to display the keyboard interface.

Figure 11:
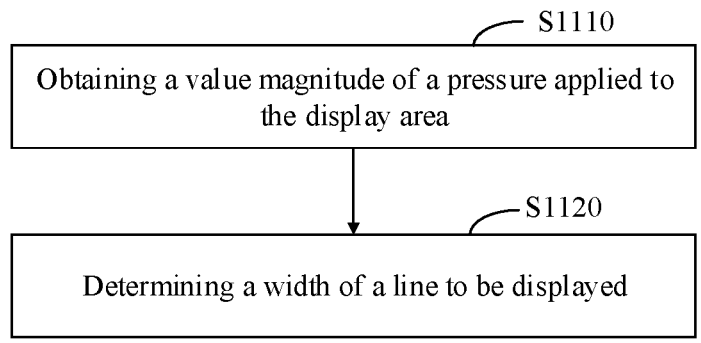
FIG. 11 is a flowchart of a content input method in accordance with an example of the present disclosure.

In an example, as shown in FIG. 11, a content input method is provided. The method is a further improvement of the above-described example. Specifically, the interactive mode includes a drawing mode. In the drawing mode, the method includes the following operations.

In operation S1110, a value magnitude of a pressure applied to the display area is obtained.

Since the input of content is controlled by the pressure in the keyboard input mode. For design convenience, optionally, in the drawing mode, the content is also inputted based on the pressure.

In operation S1120, a width of a line to be displayed on the display area is determined according to the value magnitude of the pressure applied to the display area.

When the pressure is large, the width of the line is large; when the pressure is small, the width of the line is small, to facilitate the input of lines with different widths. It should be noted that a color of the lines to be displayed on the display area can also be determined according to the value magnitude of the pressure of the display area, so as to facilitate the input of the lines with different colors. Therefore, the user experience is further improved.

Figure 12:
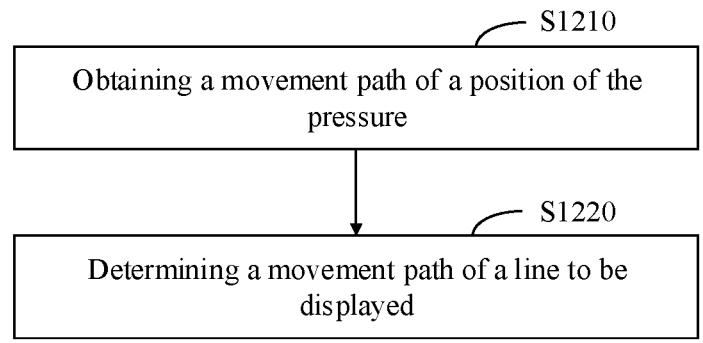
FIG. 12 is a flowchart of a content input method in accordance with an example of the present disclosure.

In an example, as shown in FIG. 12, a content input method is provided. The method is a further optimization of the methods in the foregoing examples, and the method specifically includes the following operations.

In operation S1210, a movement path of a position of a pressure applied to the display area is obtained.

Herein, optionally, the movement path of the pressure position is obtained by scanning the pressure value of each position in the display area.

In operation S1220, a trajectory of the line to be displayed on the display area is determined according to the movement path of the position of the pressure applied to the display area.

Herein, when the movement path of the pressure position is a square, a line trajectory displayed on the display area will be a square. That is, a square pattern will be displayed. Therefore, the drawing needs of user can be satisfied.

Figure 13:
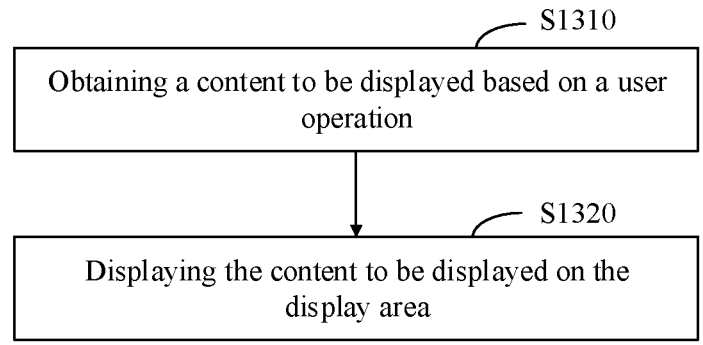
FIG. 13 is a flowchart of a content input method in accordance with an example of the present disclosure.

In an example, referring to FIG. 13, a content input method is provided. The method is an improvement of the methods in the above-described examples. Specifically, the interactive mode includes a display mode. In the display mode, the content input method includes the following operations.

In operation S1310, a content to be displayed is obtained based on a user operation.

In the display mode, the user can select the content to be displayed and the display manner to be adopted. The display manner includes, for example, displaying the content to be displayed in the form of an e-book, or displaying other images as the content to be displayed on the display area. Therefore, the different needs of user can be satisfied.

In operation S1320, the content to be displayed is displayed on the display area.

After the user confirms the content to be displayed and the display mode, the respective content to be displayed is displayed in the selected display mode. For example, the content input device in the embodiment can be used as a second screen to display a desktop content on an external device in the manner of copy display, or in a manner of extended display to increase the overall display area of the external device, and to display more contents.

Figure 14:
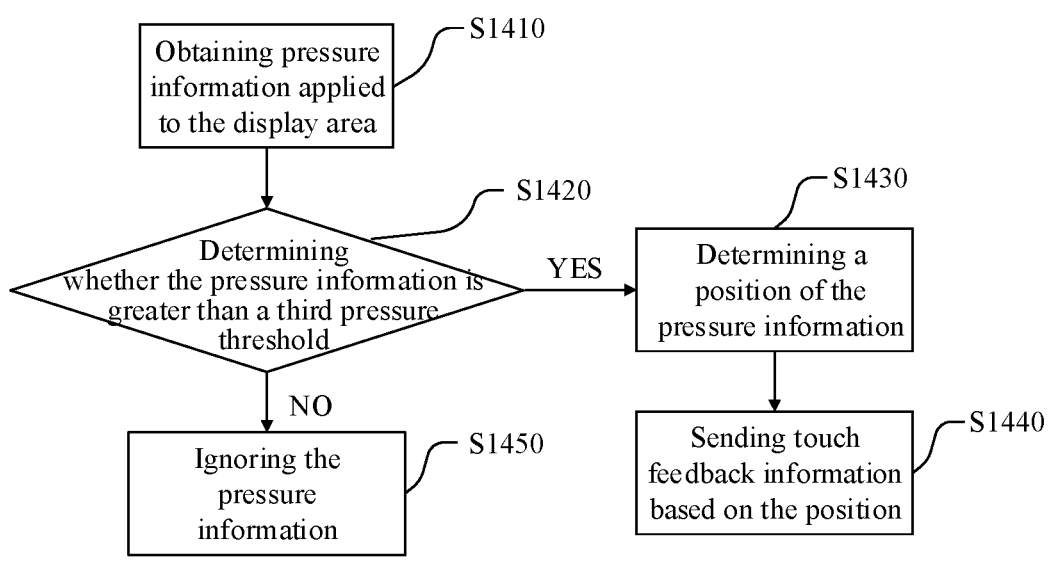
FIG. 14 is a flowchart of a content input method in accordance with an example of the present disclosure.

In an embodiment, referring to FIG. 14, a content input method is provided. The method is a further improvement of the methods in the above-described embodiments. Specifically, in the display mode, the content input method includes the following operations.

In operation S1410, pressure information applied to the display area is obtained.

In the display mode, the content input device in the embodiment can be used as a display screen. Since the display area in the embodiment can receive pressure information, the content input device is connected to an external device with an operating system, and the content input device can receive the content input by the user through touch. When the content inputted by the user is determined, the touch position of the user is mainly determined according to the pressure position. Therefore, it is necessary to obtain the pressure information applied to the display area.

In operation S1420, it is determined whether the pressure information applied to the display area is greater than a third pressure threshold.

Different users have different strengths when performing touch operations, and a corresponding third pressure threshold can be set according to different user habits to better meet different needs of user.

In generally, if the user performs the touch operation according to their wishes, the strength of the finger pressing the display interface will be relatively large. When the user touches the display interface inadvertently instead of touching the display interface according to his wishes, the pressing strength will usually be relatively small. By setting the third pressure threshold, the strengths of the user pressing the display interface can be categorized, and then it is determined whether it is a valid touch operation. In addition, since the strength of pressing the keyboard is generally greater than the strength of the touch operation, optionally, the third pressure threshold is smaller than the first pressure threshold. For example, the third pressure threshold is 10 gf.

In operation S1430, if the pressure information applied to the display area is greater than the third pressure threshold, a position of the pressure information applied to the display area is determined.

If the determination result in operation S1420 is yes, it means that the user has performed the operation according to their wishes, then it is necessary to confirm a location of the pressure information, in order to confirm the operation input by the user. The touch operation may include, for example, moving part of the content on the display interface, zooming out a picture on the display interface, closing or opening an application, and so on.

In operation S1440, touch feedback information is sent based on the position.

In the operation, when the content input device in the embodiment is used as a display, the content input device is electrically connected to a smart device with an operating system, and the touch position of the user may be finally outputted to the smart device, and the outputted position is outputted to the smart device in the form of coordinates. When the smart device receives the position in the form of coordinates, it can accurately determine the operation performed by the user, and then display the content or perform further operation according to the operation of user.

At the same time, in order to provide feedback to the user, while the operating position is outputted, touch feedback information such as vibration, buzzer, etc. can also be send, to feed back to the user instantly, so that the user can confirm whether the touch operation is valid.

In operation S1450, if the pressure information applied to the display area is not greater than the third pressure threshold, the pressure information is ignored.

In the content input method, if it is determined that the pressure information is less than or equal to the third pressure threshold, it means that the pressure information obtained indicates that the user don't want to perform touch operations subjectively, then the pressure information is ignored, so as to avoid inputting unwanted operation due to inadvertent touch during touch operation and avoid affecting the touch operation experience.

In the above-described content input method, part of the inadvertent touch information can be filtered out by setting the third pressure threshold, so as to avoid the occurrence of the inadvertent touch. Therefore, the efficiency of the touch operation and the user experience can be improved.

Figure 15:
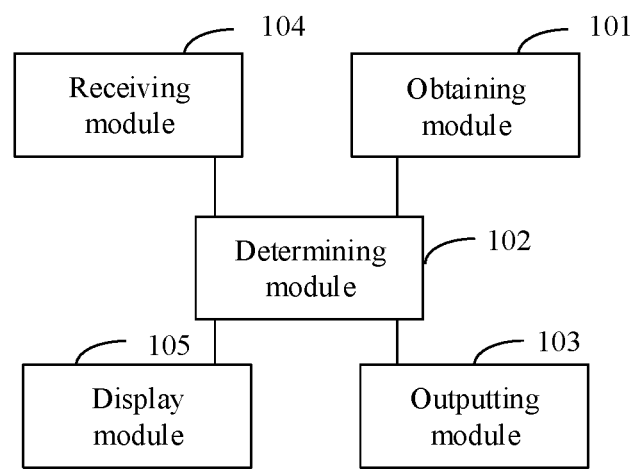
FIG. 15 is a block diagram of a content input apparatus in accordance with an example of the present disclosure.

In an embodiment, referring to FIG. 1 and FIG. 15, a content input apparatus is provided, which is applied to a touch input device. The content input device includes an obtaining module 101 and a determining module 102. The apparatus of the embodiment is applied to the content input method from the above mentioned operations S110-S140. In the implementation, the obtaining module 101 is configured to obtain pressure information applied to a first preset area of the display area;

the determining module 102 is configured to determine whether the pressure information applied to the first preset area is inadvertent touch information according to the first pressure threshold;

the determining module 102 is further configured to ignore the pressure information if the pressure information applied to the first preset area is the inadvertent touch information.

In an embodiment, referring to FIG. 2 and FIG. 15, a content input apparatus is provided. The content input apparatus is an improvement of the above-described content input apparatus and is applied to the content input method from the above mentioned operations S210-S240. In the implementation:

the obtaining module 101 is further configured to obtain a pre-stored first pressure threshold;

the determining module 102 is further configured to determine whether the pressure information applied to the first preset area is greater than the first pressure threshold; and if the pressure information applied to the first preset area is not greater than the first pressure threshold, determine that the pressure information applied to the first preset area is inadvertent touch information.

In an embodiment, referring to FIG. 3 and FIG. 15, a content input apparatus is provided. The apparatus is an improvement of the above-described content input apparatuses, and further includes an outputting module 103. The apparatus is applied to the above-described content input method in operations S310-S360. In the implementation, the determining module 102 is further configured to: if the pressure information applied to the first preset area is not inadvertent touch information, determine a position of the pressure information applied to the first preset area in the display area; determine a key value, corresponding to the position, on the keyboard interface according to the position;

the outputting module 103 is configured to output the key value corresponding to the pressure information applied to the first preset area.

In an embodiment, referring to FIG. 4 and FIG. 15, a content input apparatus is provided. The apparatus is a further optimization of the above-described content input apparatuses and applied to the content input method from operations S410-S420. In the implementation, the obtaining module 101 is further configured to obtain a number of touch points applied to the display area;

the determining module 102 is further configured to perform a blind point position conformation, if the number of the touch points is greater than or equal to a first preset threshold.

In an embodiment, referring to FIG. 5 and FIG. 15, a content input apparatus is provided. The apparatus is a further optimization of the above-described content input apparatuses and applied to the above-described content input method in operations S510-S540. In the implementation, the obtaining module 101 is further configured to obtain pressure information applied to at least two second preset areas respectively;

the determining module 102 is further configured to determine whether non-zero pressure information respectively applied to the at least two second preset areas is obtained at the same time; and if non-zero pressure information respectively applied to the at least two second preset areas is not obtained at the same time, send a blind point reminder message.

In an embodiment, referring to FIG. 6 and FIG. 15, a content input apparatus is provided. The apparatus is an improvement of the above-described content input apparatuses, and is applied to the above-described content input method in operations S610-S640. In the implementation process, the determining module 102 is further configured to exit the blind point position confirmation, if the non-zero pressure information respectively applied to the at least two second preset areas is obtained at the same time.

In an embodiment, referring to FIG. 7 and FIG. 15, a content input apparatus is provided. The apparatus is an improvement of the above-described content input apparatuses and applied to the above-described content input method in operations S710-S730. In the implementation, the obtaining module 101 is further configured to detect whether pressure information is presently received in the display area;

the determining module 102 is further configured to: if the pressure information is presently received, determine a length of an interval between a time when the pressure information is presently received and a time when pressure information was received last time; and if the length of the interval is greater than or equal to a first preset duration, perform the blind point position conformation.

In an embodiment, referring to FIGS. 8 and 15, a content input apparatus is provided. The apparatus is an improvement of the above-described content input apparatuses, and applied to the above-described content input method in operations S810-S830. In the implementation, the obtaining module 101 is further configured to detect whether pressure information is presently received in a third preset area of the display area;

the determining module 102 is further configured to: if the pressure information is presently received, determine a length of an interval between a time when the pressure information is presently received and a time when pressure information was received last time; and if the length of the interval is greater than or equal to a second preset duration, perform the blind point position conformation.

In an embodiment, referring to FIG. 9 and FIG. 15, a content input apparatus is provided. The apparatus is an improvement of the above-described content input apparatuses and applied to the above-described content input method in operations S910-S920. In the implementation:

the obtaining module 101 is further configured to obtain the pressure information applied to the display area;

the determining module 102 is further configured to send position feedback information if the pressure information applied to the display area is greater than a second pressure threshold.

In an embodiment, referring to FIG. 10 and FIG. 15, a content input apparatus is provided. The apparatus is an improvement of the above-described content input apparatuses, and includes a receiving module 104. The apparatus is applied to the above-described content input method in operations S1010-S1030. In the implementation, the receiving module 104 is configured to receive pressure information applied to a mode switch area of the display area;

the determining module 102 is further configured to determine mode information corresponding to a position of the pressure information applied to the mode switch area; and switch an interaction mode of the display area according to the mode information.

In an embodiment, referring to FIG. 11 and FIG. 15, a content input apparatus is provided. The apparatus is an improvement of the above-described content input apparatuses and applied to the above-described content input method in operations S1110-S1120. In the implementation, the interactive mode includes a drawing mode, and in the drawing mode, the obtaining module 101 is further configured to obtain a value magnitude of a pressure applied to the display area;

the determining module 102 is further configured to determine a width of a line to be displayed on the display area according to the value magnitude of the pressure applied to the display area.

In an embodiment, referring to FIG. 12 and FIG. 15, a content input apparatus is provided. The apparatus is an improvement of the above-described content input apparatuses and is applied to the above-described content input method in operations S1210-S1220. In the implementation, the interactive mode includes the drawing mode, and in the drawing mode;

the obtaining module 101 is further configured to obtain a movement path of a pressure applied to the display area;

the determining module 102 is further configured to determine a trajectory of a line to be displayed on the display area according to the movement path of the position of the pressure applied to the display area.

In an embodiment, referring to FIGS. 13 and 15, a content input apparatus is provided. The apparatus is an improvement of the above-described content input apparatuses. In addition to the modules in the above embodiments, the content input apparatus in the embodiment also includes a display module 105. The embodiment is applied to the above-described content input method in operations S1310-S1320. In the implementation, the obtaining module 101 is further configured to obtain a content to be displayed based on a user operation;

the display module 105 is configured to display the content to be displayed on the display area.

In an embodiment, referring to FIG. 14 and FIG. 15, a content input apparatus is provided. The apparatus is an improvement of the above-described content input apparatuses and applied to the above-described content input method in operations S1410-S1450 described above. In the implementation, the obtaining module 101 is further configured to obtain pressure information applied to the display area;

the determining module 102 is further configured to: determine whether the pressure information applied to the display area is greater than a third pressure threshold; if the pressure information applied to the display area is greater than the third pressure threshold, determine a position of the pressure information applied to the display area; and if the pressure information applied to the display area is not greater than the third pressure threshold, ignore the pressure information;

the outputting module 103 is configured to: after the position of the pressure information applied to the display area is determined, send touch feedback information based on the position.

Figure 16:
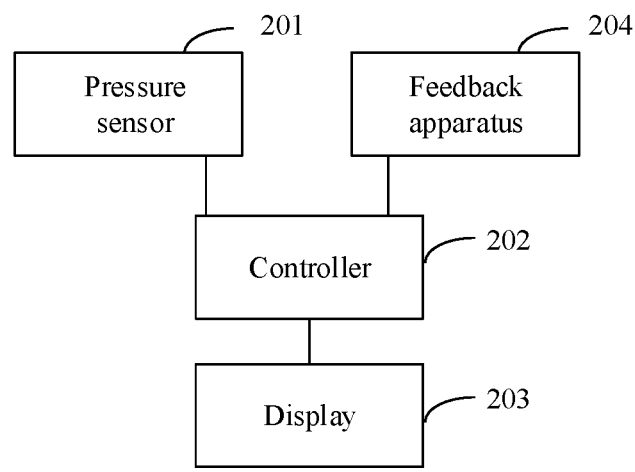
FIG. 16 is a block diagram of a touch input apparatus in accordance with an example of the present disclosure.

In an embodiment, as shown in FIG. 16, a touch input device is provided. The device includes a controller 202, and a pressure sensor 201 and a display 203 which are electrically connected to the controller 202 respectively. The display 203 is configured to form a display area. The pressure sensor 201 is configured to detect pressure information of the display area. The controller 202 is electrically connected to an external operating system. The controller 202 is configured to execute the content input method described above.

In an embodiment, referring to FIG. 16, a touch input device is provided. The device is an improvement of the above-described touch input device, and the touch input device further includes a feedback apparatus 204. The feedback apparatus 204 is electrically connected to the controller 202, and the feedback apparatus 204 is used to send feedback information.

In an embodiment, referring to FIG. 16, the touch input device includes the pressure sensor 201, the display 203, the controller 202 and the feedback apparatus 204. The pressure sensor 201 includes a pressure sensor configured to detect the effective pressing action of the user and output a coordinate data of the pressed position. The pressure sensor is light-transmissive and does not affect a screen display of the display 203. The display 203 is configured to display the interactive screen required by the current mode. The feedback apparatus 204 provides a vibration feedback for human-computer interaction during the interaction process. Specifically, the feedback apparatus 204 may be a piezoelectric ceramic or a linear motor. The controller 202 is configured to switch various working modes of the touch input device, receive and determine the pressure information pressed by the finger and the coordinate data of the pressure, and send the current mode information and the coordinate data of the pressure to the external operating system.

The touch input device has a drawing mode, a display mode and a keyboard input mode. When the touch input device is in the display mode, for example, it can be used as a second display screen of the computer for extended display or copy display of images. Specifically, when the controller 202 controls the touch input device to switch to the display mode, the display 203 is used as a display of an external operating system (i.e., a Windows system) for displaying the screen of the external operating system. When the touch input device is in the drawing mode, the pressure sensor 201 can perform multi-level pressure detection, and cooperate with the drawing software to perform professional drawing operation, such as performing the drawing operations through the above-mentioned content input method. When the touch input device is in the keyboard input mode, the text can be inputted through the above-mentioned content input method.

In another embodiment, in order to facilitate the blind point position confirmation, optionally, on the surface cover of the pressure sensor 201, protrusions or grooves are formed at the positions of the F and J buttons to assist the user in discovering these two buttons. to assist the user in finding the two buttons.

Figure 17:
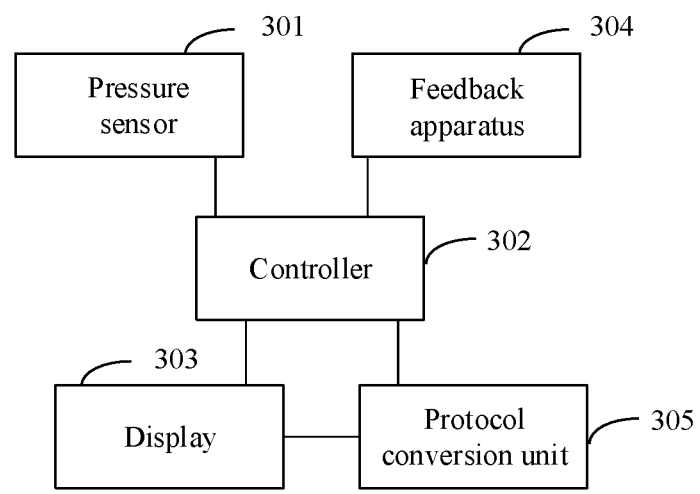
FIG. 17 is a block diagram of a touch input apparatus in accordance with an example of the present disclosure.

In an embodiment, referring to FIG. 17, a touch input device is provided. The touch input device is an improvement of the above-mentioned touch input devices, and the touch input device further includes a protocol conversion unit 305. The protocol conversion unit 305 is electrically connected to the display 303 and the controller 302, respectively, and is configured to convert the data of the display 303 to match the data requirements of the controller 302.

In an embodiment, there is also provided a non-transitory computer-readable storage medium including instructions, such as a memory including instructions. The instructions can be executed by the controller of the touch input device to complete the content input method described above. For example, the non-transitory computer-readable storage medium may be a read only memory (ROM), a random access memory (RAM), a CD-ROM, a magnetic tape, a floppy disk, an optical data storage device, etc. When the instructions in the storage medium are executed by the controller of the touch input device, the touch input device is enabled to execute the content input method shown in the foregoing embodiments.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The technical solution provided by the embodiments of the disclosure may have the following beneficial effects: it is determined whether respective pressure information is the inadvertent touch information by setting to first pressure threshold. If the pressure information is the inadvertent touch information, the pressure information is ignored. When the user puts his palm on the display area for support, as long as the value of the pressure applied to the area where the palm is in contact with the display area does not greater than the first pressure threshold, the pressure applied to the display area will not be recognized, and an inadvertent touch can be avoid. Therefore, it is convenient for users to use, the accuracy and efficiency of content input are improved, and the user experience is improved.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes may be made without departing from the scope thereof

What is claimed is:

1. A content input method, applied to a touch input device comprising a display area, the display area displays a keyboard interface when the touch input device is in a keyboard input mode, comprising:
    obtaining pressure information applied to a first preset area of the display area;
    determining, according to a first pressure threshold, whether the pressure information applied to the first preset area is inadvertent touch information; and
    in response to determining that the pressure information applied to the first preset area is not the inadvertent touch information, obtaining a number of touch points applied to the display area;
    in response to determining that the number of the touch points is greater than or equal to a first preset threshold, performing a blind point position conformation, wherein the performing the blind point position conformation comprises:
    obtaining pressure information applied to at least two second preset areas;
    determining whether non-zero pressure information respectively applied to the at least two second preset areas is obtained at a same time, wherein the at least two second preset areas are areas corresponding to at least two keys in the keyboard interface; and
    in response to determining that the non-zero pressure information respectively applied to the at least two second preset areas is not obtained at the same time, sending a blind point reminder message.

2. The content input method of claim 1, wherein determining, according to the first pressure threshold, whether the pressure information applied to the first preset area is the inadvertent touch information comprises:
    obtaining a pre-stored first pressure threshold;
    determining whether the pressure information applied to the first preset area is greater than the first pressure threshold; and
    when the pressure information applied to the first preset area is not greater than the first pressure threshold, determining that the pressure information applied to the first preset area is the inadvertent touch information.

3. The content input method of claim 1, further comprising:
    determining a position of the pressure information applied to the first preset area in the display area when the pressure information applied to the first preset area is not the inadvertent touch information;
    determining, according to the position, a key value, corresponding to the position, on the keyboard interface; and
    outputting the key value corresponding to the pressure information applied to the first preset area.

4. The content input method of claim 1, wherein, when the non-zero pressure information respectively applied to the at least two second preset areas is obtained at the same time,
    exiting the blind point position conformation;
    detecting whether pressure information is presently received in the display area;
    when the pressure information is presently received, determining a length of an interval between a time when the pressure information is presently received and a time when pressure information was received last time; and
    when the length of the interval is greater than or equal to a first preset duration, performing the blind point position conformation.

5. The content input method of claim 1, further comprising:
    obtaining pressure information applied to the display area;
    when the pressure information applied to the display area is greater than a second pressure threshold, sending position feedback information.

6. The content input method of claim 1, further comprising:
    receiving pressure information applied to a mode switch area of the display area;
    determining mode information corresponding to a position of the pressure information applied to the mode switch area; and
    switching, according to the mode information, an interactive mode with the display area.

7. The content input method of claim 6, wherein the interactive mode comprises a drawing mode, and in the drawing mode, the content input method further comprises:
    obtaining a value magnitude of a pressure applied to the display area; and determining, according to the value magnitude of the pressure applied to the display area, a width of a line to be displayed on the display area, or
    obtaining a movement path of a position of a pressure applied to the display area; and determining, according to the movement path of the position of the pressure applied to the display area, a trajectory of a line to be displayed on the display area.

8. The content input method of claim 6, wherein the interactive mode comprises a display mode, and in the display mode, the content input method further comprises:
    obtaining a content to be displayed based on a user operation;
    displaying the content to be displayed on the display area;
    obtaining pressure information applied to the display area;
    determining whether the pressure information applied to the display area is greater than a third pressure threshold;
    when the pressure information applied to the display area is greater than the third pressure threshold, determining a position of the pressure information applied to the display area; and
    sending touch feedback information based on the position.

9. A touch input device, comprising a controller, a pressure sensor and a display which are electrically connected to the controller, and the controller is electrically connected to an external operating system, wherein the controller is configured to:

obtain, via the pressure sensor, pressure information applied to a first preset area of a display area on the display;

determine, according to a first pressure threshold, whether the pressure information applied to the first preset area is inadvertent touch information;

in response to determining that the pressure information applied to the first preset area is not the inadvertent touch information, obtain a number of touch points applied to the display area;

in response to determining that the number of the touch points is greater than or equal to a first preset threshold, perform a blind point position conformation, wherein the controller is further configured to:

obtain pressure information applied to at least two second preset areas;

determine whether non-zero pressure information respectively applied to the at least two second preset areas is obtained at a same time, wherein the at least two second preset areas are areas corresponding to at least two keys in the keyboard interface; and in response to determining that the non-zero pressure information respectively applied to the at least two second preset areas is not obtained at the same time, send a blind point reminder message.

10. The touch input device of claim 9, wherein the controller is further configured to:

obtain a pre-stored first pressure threshold;

determine whether the pressure information applied to the first preset area is greater than the first pressure threshold; and when the pressure information applied to the first preset area is not greater than the first pressure threshold, determine that the pressure information applied to the first preset area is the inadvertent touch information.

11. The touch input device of claim 9, wherein the controller is further configured to:

determine a position of the pressure information applied to the first preset area in the display area when the pressure information applied to the first preset area is not the inadvertent touch information;

determine, according to the position, a key value, corresponding to the position, on the keyboard interface; and output, via the display, the key value corresponding to the pressure information applied to the first preset area.

12. The touch input device of claim 9, wherein the controller is further configured to:

exit the blind point position confirmation, when the non-zero pressure information respectively applied to the at least two second preset areas is obtained at the same time;

detect whether pressure information is presently received in the display area;

when the pressure information is presently received, determine a length of an interval between a time when the pressure information is presently received and a time when pressure information was received last time; and when the length of the interval is greater than or equal to a first preset duration, perform the blind point position conformation.

13. The touch input device of claim 9, wherein the controller is further configured to:

obtain pressure information applied to the display area via the pressure sensor; and send position feedback information when the pressure information applied to the display area is greater than a second pressure threshold.

14. The touch input device of claim 9, wherein the controller is further configured to:

receive pressure information applied to a mode switch area of the display area via the pressure sensor;

determine mode information corresponding to a position of the pressure information applied to the mode switch area; and switch, according to the mode information, an interaction mode with the display area.

15. The touch input device of claim 14, wherein the interactive mode comprises a drawing mode, and in the drawing mode, the controller is further configured to:

obtain a value magnitude of a pressure applied to the display area via the pressure sensor; and determine, according to the value magnitude of the pressure applied to the display area, a width of a line to be displayed on the display area; or obtain a movement path of a pressure applied to the display area via the pressure sensor; and determine, according to the movement path of the position of the pressure applied to the display area, a trajectory of a line to be displayed on the display area.

16. The touch input device of claim 14, wherein the content input device further comprises a feedback apparatus, the interaction mode comprises a display mode, and in the display mode, the controller is further configured to:

obtain a content to be displayed based on a user operation;

display, via the display, the content to be displayed on the display area;

obtain, via the pressure sensor, pressure information applied to the display area;

determine whether the pressure information applied to the display area is greater than a third pressure threshold;

when the pressure information applied to the display area is greater than the third pressure threshold, determine a position of the pressure information applied to the display area; and send touch feedback information based on the position via the feedback apparatus.

17. A non-transitory computer-readable storage medium storing instructions, which, when being executed by a controller of a touch input device, cause the touch input device to perform:

obtaining pressure information applied to a first preset area of a display area;

determining, according to a first pressure threshold, whether the pressure information applied to the first preset area is inadvertent touch information;

in response to determining that the pressure information applied to the first preset area is not the inadvertent touch information, obtaining a number of touch points applied to the display area; and in response to determining that the number of the touch points is greater than or equal to a first preset threshold, performing a blind point position conformation, wherein the performing the blind point position conformation comprises:

obtaining pressure information applied to at least two second preset areas;

determining whether non-zero pressure information respectively applied to the at least two second preset areas is obtained at a same time, wherein the at least two second preset areas are areas corresponding to at least two keys in the keyboard interface; and in response to determining that the non-zero pressure information respectively applied to the at least two second preset areas is not obtained at the same time, sending a blind point reminder message.

\* \* \* \* \*